(12) United States Patent
Abbasi et al.

(10) Patent No.: US 8,534,715 B2
(45) Date of Patent: Sep. 17, 2013

(54) SEALABLE DRAIN PIPE COUPLING

(76) Inventors: Abdul Latif Abbasi, Toronto (CA);
Jamal Yousufzai, Toronto (CA)

( * ) Notice: Subject to any disclaimer, the term of this patent is extended or adjusted under 35 U.S.C. 154(b) by 843 days.

(21) Appl. No.: 12/577,177

(22) Filed: Oct. 10, 2009

(65) Prior Publication Data

US 2011/0084475 A1  Apr. 14, 2011

(51) Int. Cl.
  *F16L 27/12* (2006.01)
(52) U.S. Cl.
  USPC ............ 285/338; 285/32; 285/57; 285/145.5; 285/300
(58) Field of Classification Search
  USPC ............... 285/57, 121.2, 123.6, 145.1, 145.4, 285/145.5, 148.6, 291.2, 300, 301, 338, 913, 285/32
  See application file for complete search history.

(56) References Cited

U.S. PATENT DOCUMENTS

| RE23,748 | E | * | 12/1953 | Barber | 285/39 |
| 2,993,655 | A | * | 7/1961 | O'Brien | 239/582.1 |
| 3,107,687 | A | * | 10/1963 | Howe | 137/362 |
| 3,436,084 | A | * | 4/1969 | Courter | 277/338 |

* cited by examiner

*Primary Examiner* — James Hewitt
*Assistant Examiner* — Jay R Ripley
(74) *Attorney, Agent, or Firm* — Nasser Ashgriz (57) ABSTRACT

The present invention relates to an apparatus which forms a sealed joint between two pipes, particularly but not limited to roofing drain pipes. This apparatus includes a cylindrical body made of rubber or similar material that grips and seals two pipes when it is axially compressed by two halves of an articulated housing as they move towards each other. The two half bodies of the articulated housing are threaded to each other such that when one body is rotated in one direction, the bodies move towards each other, thereby reducing the overall length of the housing, and compressing/deforming the rubber seal.

3 Claims, 10 Drawing Sheets

SEALABLE DRAIN PIPE COUPLING

FIELD OF THE INVENTION

The present invention relates to a coupling device that sealably connects a roof drain inserts inside a drain pipe. Sealed coupling devices are used to connect two pipes to each other and making sure that there will be no leaks.

DESCRIPTION OF THE RELATED ART

Many buildings have roof drains to remove rain or melted snow water. Roof drains are more common in flat top asphalt roofs. In many occasions, such as in resurfacing of a roof, the height of the roof may be increased. Therefore, the drain pipe has to be extended. One simple and low cost method of extending the drain pipe, without removing the whole pipe, is to tightly insert a smaller pipe into the drain pipe. The insert is then sealed using adhesives or caulking compounds. However, these types of seals are generally not reliable and there is a potential for the development of cracks and consequently leakage.

An alternative to use of adhesives and caulking compounds is suggested by Uglow's in the U.S. Pat. No. 4,505,499. They disclosed a roof drain insert "coupling" consisting of a cylinder that is allowed to slide into another concentric cylinder by tightening a plurality of screws. A cylindrical seal made of a fluid impermeable, compressible elastomeric material preferably of neoprene elastomers or rubber is located around the cylinders such that when the cylinders are tightened to move towards each other, the seal is compressed and deformed. This coupling device is correctly positioned within two concentric pipes and the screws are tightened to deform the seal. The deformed seal grips the pipes, sealing the coupling between the two pipes. The correct tightening procedure for this apparatus requires locating a screwdriver more than one time at each screw location and tightening each by the same torque to ensure equal distribution of compressive/gripping/sealing force. If one or more screws are not properly tightened during the installation, they may lead to seal failure.

Accordingly, it is an object of the present invention to overcome these disadvantages of the prior art by providing a novel coupling device which permits a drain insert to be securely and sealably affixed inside a drain pipe.

SUMMARY OF THE INVENTION

One object of the present device is to provide an easier method of installing a drain insert, by providing a large castle head, instead of individual screws. This reduces the time and effort to position the tool and install the insert. Another object of the present device is to allow for tightening the device with a single tightening operation, rather than multiple tightening operating of multiple screws. This reduces installation time and increases productivity, while eliminating the chance that one or more screws are left loose and undetected. Another object of the present device is to provide a better seal quality by tightening the cylinders uniformly towards each other with uniform compressive force on the seal material. Another object of the present device is to reduce the installation time and effort, thereby reducing installation cost. Another object of the present invention is to provide a device which is easier to manufacture and has small number of parts, as well as eliminating all metal parts.

The present invention is a cylindrical coupling which forms a sealed joint between two concentric pipes. To this end, a pipe coupling device is provided to sealably couple one end of a small diameter cylindrical pipe, slidable within a larger diameter cylindrical pipe, coaxially within the larger pipe. The apparatus is fully enclosed within the joining pipes, and therefore sized to be positioned inside.

The apparatus consists of an articulated housing comprised of two cylindrical bodies, concentrically assembled by means of integrated threads. As one half is rotated, the threads tighten to reduce the overall cylindrical length of the assembly. The cylindrical bodies each include a collar such that when the halves are assembled together, the two collars are positioned at each end of the housing. A collar on at least one of the two cylindrical halves of the articulated housing also provides a means of rotating/tightening the assembly. The present embodiment of the invention has a castle head at one face that allows an appropriately shaped tool to rotate and tighten the assembly. A cylindrical elastic body of rubber or similar material, is concentrically located around the articulated housing. The collars at the extreme ends of the housing hold the cylindrical elastic body at both ends. As the housing is tightened, the elastic body is compressed, and deforms to grip and seal an appropriately sized pipe interface.

Additionally, the apparatus may also include a means to prevent the cylindrical elastic body to rotate when one end of the articulated housing is rotated. In one embodiment of the invention, a ring is located between the rotating collar and the elastic body. Lubricating material may also be applied between the two surfaces. Any other means of ensuring lubrication may be adopted to prevent the cylindrical elastic body to rotate with the rotating half of the articulated housing.

Additionally, the apparatus may also include a means to prevent the assembly from unintentionally rotating and loosening after it is installed. In this embodiment of the invention, the said ring has indentations on at least one face, and the articulated housing has at least one bump on the inner face of its collar. Once the assembly is fully tightened, the indentations on the ring grip at least one bump on the collar. This feature makes the assembly hard to rotate once it is tight, and therefore prevents it from loosening due to vibration or any other means. However, the indentations or bumps may be located on any other part of the assembly as long as the said purpose is achieved. The indentations may also take the form of a ratchets that only allow the assembly to be rotated in one direction.

The present invention can be installed by only one tightening operation, and provides the convenience of easy location of the tightening tool. The prior art pipe sealing joints consisted of more than one fastener, and therefore required locating a screwdriver more than one time at each fastener location and tightening each to the same torque to ensure equal distribution of compressive/gripping/sealing force. One or more screws not properly tightened during installation were easy to be left undetected and may have lead to seal failure.

These and other objects of the present invention will become readily apparent upon further review of the following specification and drawings. To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the figures, which illustrate, by way of example only, embodiments of the present invention.

DETAILED DESCRIPTION OF THE INVENTION

Figure 1:
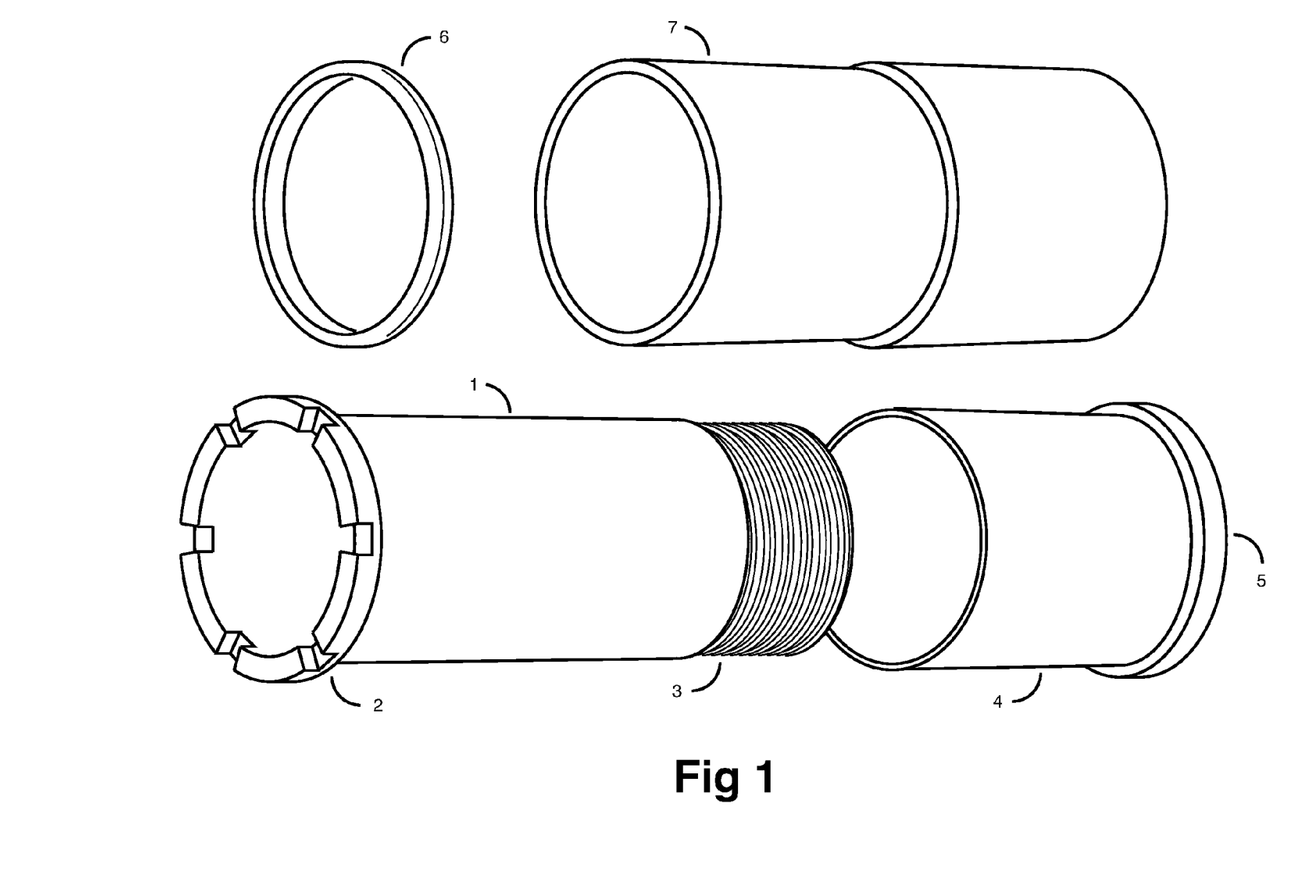
FIG. 1 illustrates an exploded view of the present invention.
Figure 2:
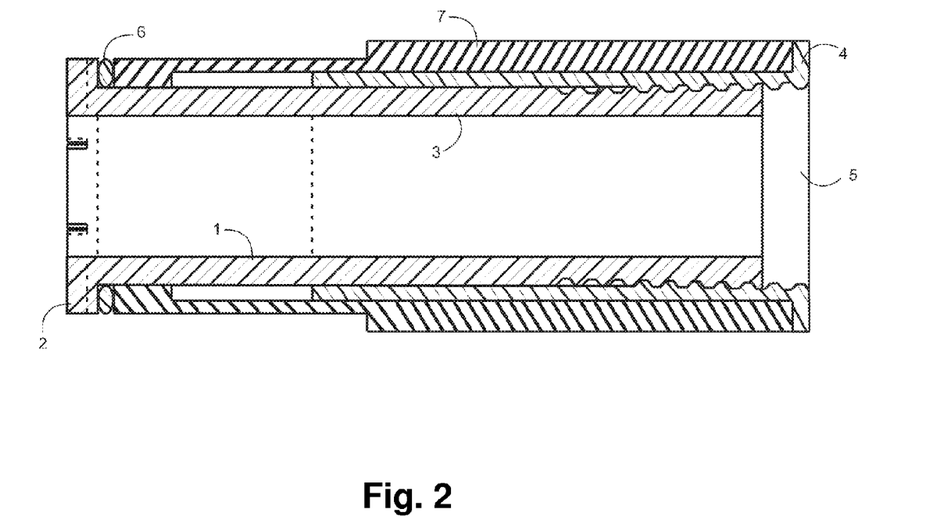
FIG. 2 is the side cross sectional view illustration of the pipe sealing joint in its extended/uncompressed state.
Figure 3:
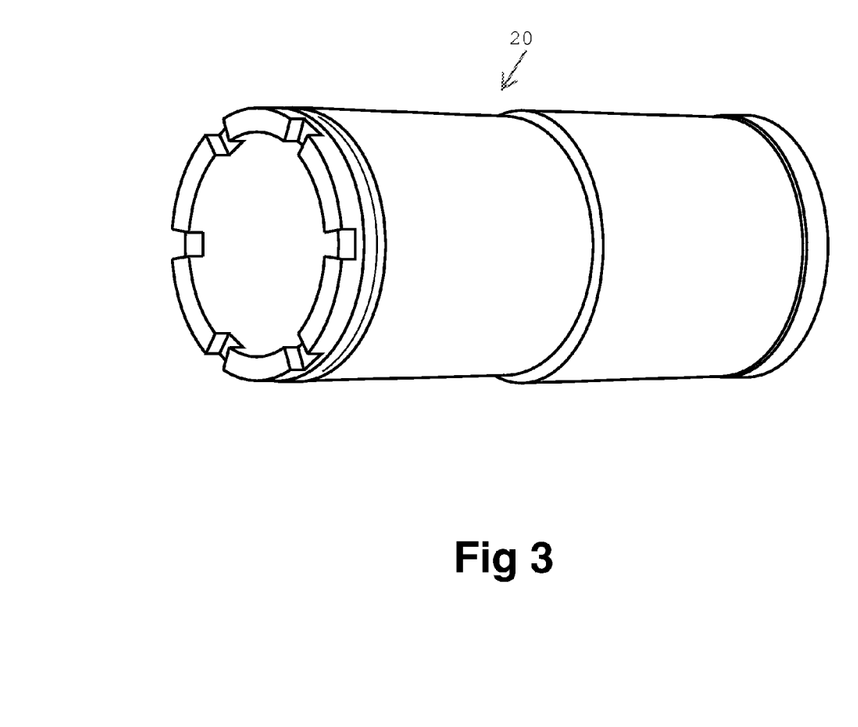
FIG. 3 is an isometric illustration of the invention in its extended state.

The present invention is a pipe coupling which forms a sealed joint between two concentric pipes. In particular, the present device is used for connecting a new pipe to an existing drain pipe of the type generally found on the roof tops. As FIGS. 1-3 show, the present invention is comprised of two solid tubular/cylindrical bodies 1 and 4, an elastic tubular body 7 of rubber or similar material, and a ring 6 to prevent the elastic material to grip and rotate with the rotating body 1. The tubular bodies 1 and 4 can be connected to each other by means of threads to form an articulated housing.

Figure 4:
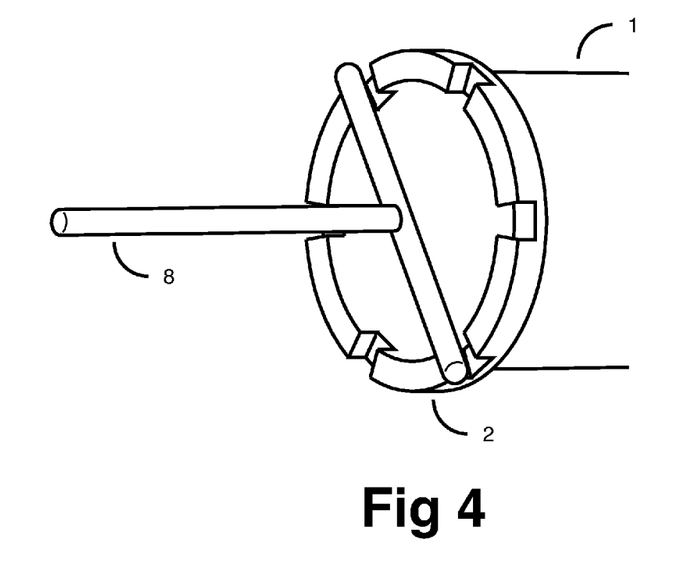
FIG. 4 is a close up isometric illustration of the interface between the rotating half of the articulated housing, and the tightening tool.

One end of the tubular body 1 has a collar 2. This collar is shaped as a castle head. The castle head shape allows for an easy access to the head using an appropriately shaped tool 8, as shown in FIG. 4. However, any other shape may be used to provide a mating head for the tightening tool 8. At the opposite end, the tubular body 1 consists of fastening threads 3 on the external side of its cylindrical surface.

The tubular body 4 has an internal diameter slightly larger than the outer diameter of the tubular body 1. At one end of the body 4, is a collar 5. Part of the inner surface of the tubular body 4 consists of fastening threads, appropriately sized to mate with the external threads 3 of the body 1.

Figure 5:
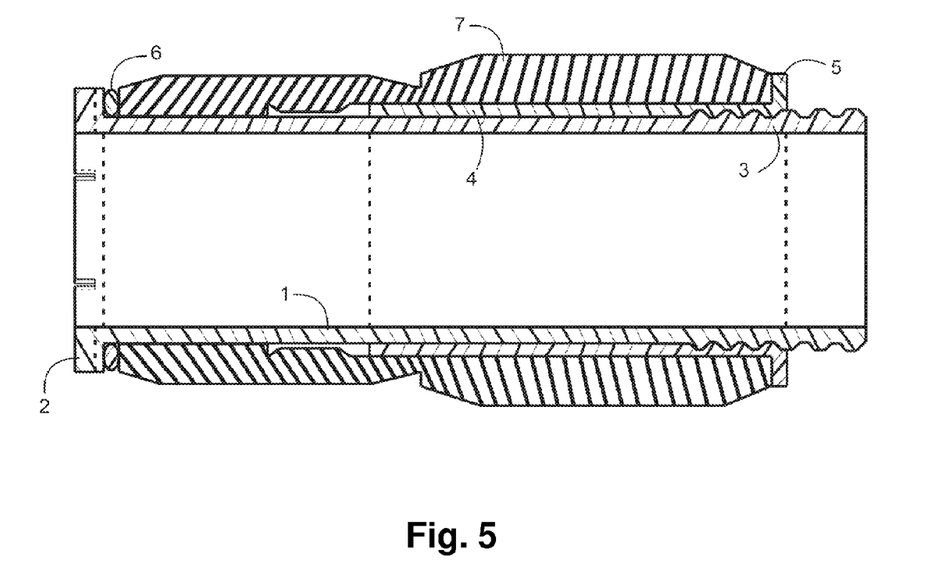
FIG. 5 is the side cross sectional view illustration of the pipe sealing joint in its tightened state, showing the deformation of the sealing material due to axial compression.
Figure 6:
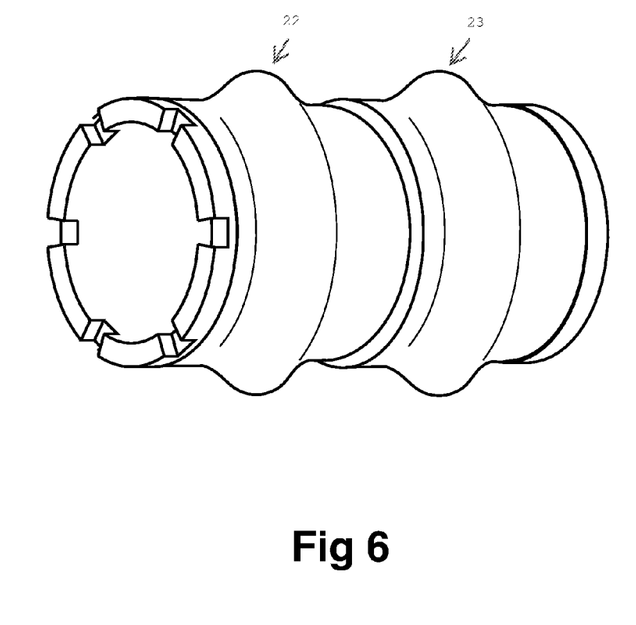
FIG. 6 is an isometric illustration of the invention in its tightened state, showing the deformation of the sealing material due to axial compression.

A tubular elastic body 7 of internal diameter larger than the tubular bodies 1 and 4 made of rubber or similar material (natural or synthetic, a fluid impermeable, compressible elastomeric material preferably of neoprene elastomers or rubber), hereby referred to as 'seal', is appropriately sized and contoured to internally grip and seal the joining pipes. The elastic body 7 is concentrically positioned over the tubular bodies 1 and 4 as they are assembled, such that the collars 2 and 5 at the extreme ends of the assembled articulated housing, hold the elastic body 7 at both ends (see FIGS. 2 and 3). A ring 6 may be placed between the collar 2 of the rotating body 1 and one end of the elastic body 7 (see FIG. 2) in order to reduce friction and prevent the elastic body from twisting or rotating when the tubular body 1 is rotated. Additionally, other lubricants or lubricating materials may also be applied between the bodies 1 and 7 in order to further ease the installation and tightening of the apparatus. As the tubular element 1 is turned, the elastic cover 7 compresses and, therefore, deforms radially outward 21 and 22, as illustrated in FIGS. 5 and 6. This deformation forms a seal with the external pipes.

Figure 7:
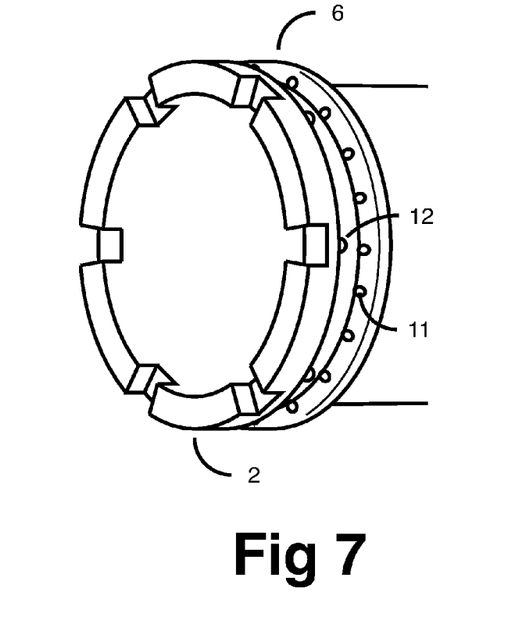
FIG. 7 is a close up isometric view of the mechanism that prevents the assembly from unintentionally loosening after it is installed.

As illustrated in FIG. 7, at least one face of the ring 6 has indentations 11 or teeth, and the inner face of the collar 2 of the rotating body 1 has at least one bump 12 that can lock into an indentation or tooth on the ring 6 if the housing is tight enough. This mating mechanism allows the housing to be easily tightened while it is being installed, but locks the housing once it is fully tightened. However, this embodiment of the mechanism is for illustrative purposes only. This type of locking mechanism may be located at any point on the apparatus as long as it achieves the said purpose. The indentations may also take the shape of a ratchet or saw tooth such that the body 1 can only be rotated in one tightening direction.

Figure 8:
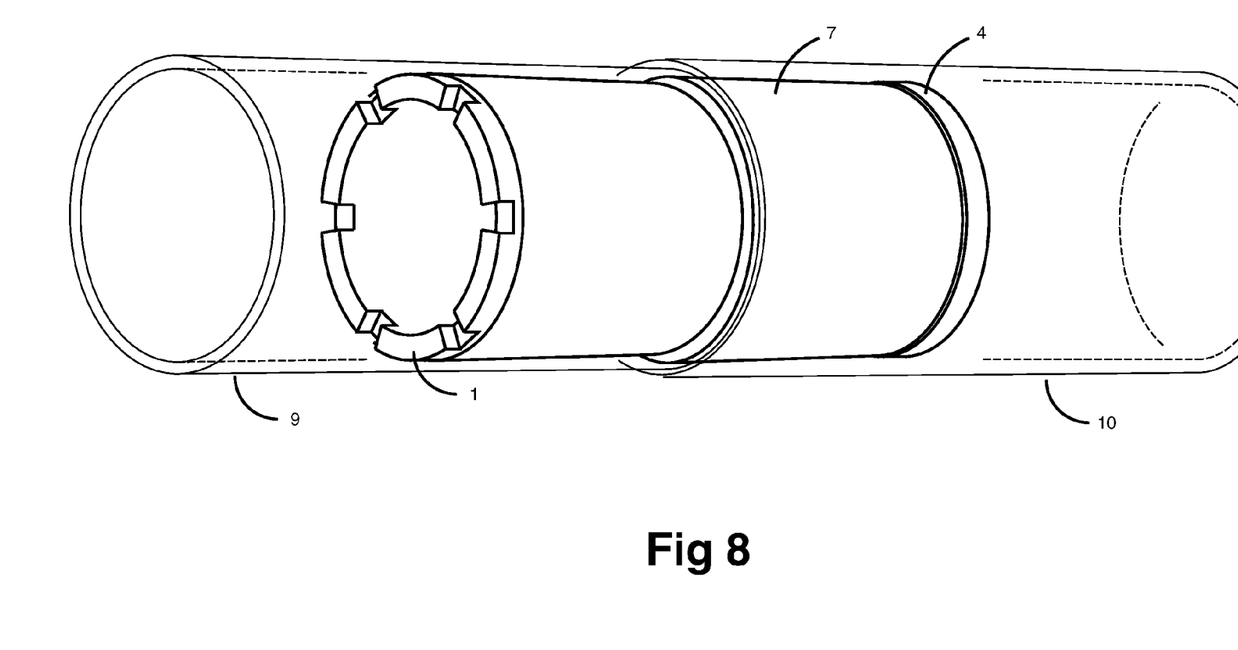
FIG. 8 is an isometric illustration of the invention in its extended state, concentrically placed inside the interface of two pipes for installation—the pipes are shown to be transparent for clarity.
Figure 9:
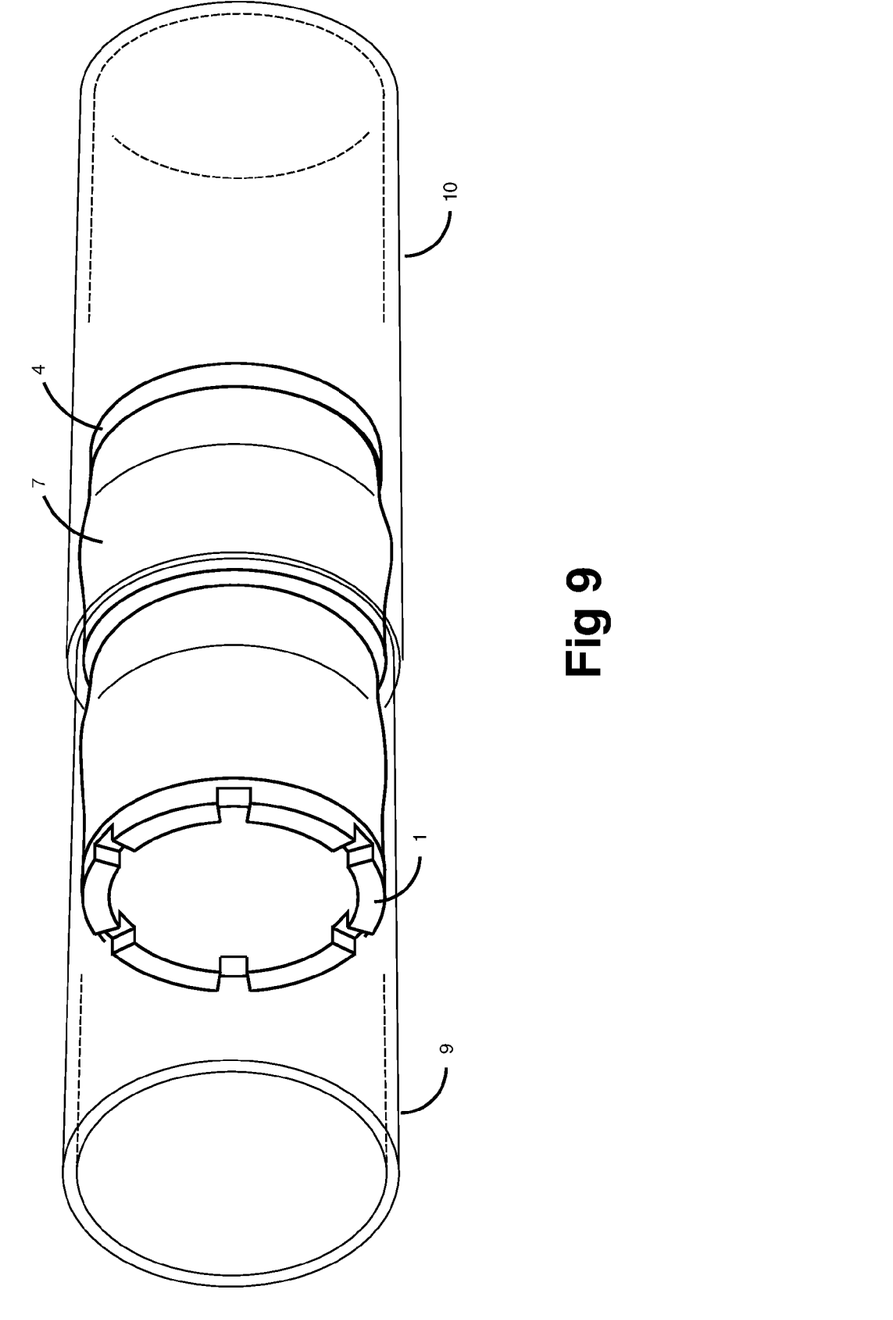
FIG. 9 is an isometric illustration of the invention in its tightened state, concentrically installed and forming a sealed joint inside the interface of two pipes—the pipes are shown to be transparent for clarity.

Therefore, the present invention can be used to sealably secure an insert into a roof drain pipe. To this end, the present coupling 20 (illustrated in FIG. 3 in its extended state) is inserted into a drain insert pipe 9, as shown in FIG. 8. Tubular element 1 is turned until the coupler engages with the insert pipe so that it does not slip easily. Both the coupler and the insert pipe are located inside a drain pipe 10 through an inlet end of the drain pipe. A tool 8 is used to turn tubular element 1 and to further compress the elastic cover into sealing engagement with the drain pipe and drain insert as illustrated in FIG. 9. The housing squeezes and deforms the elastic body 7 to grip the pipes 9 and 10 when the apparatus is tightened.

Figure 10A:
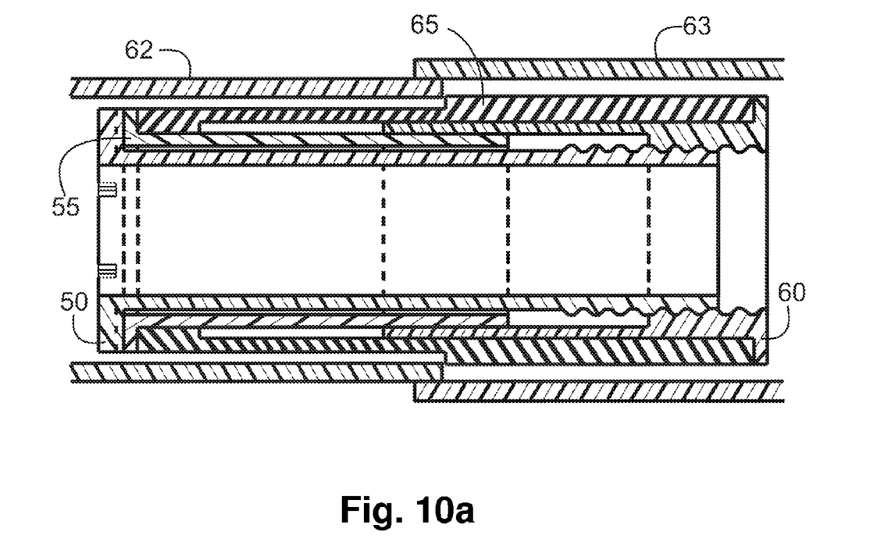
FIG. 10 illustrates the coupling device of the present invention having a third sleeve and in its (a) uncompressed state and (b) after tightening.
Figure 10B:
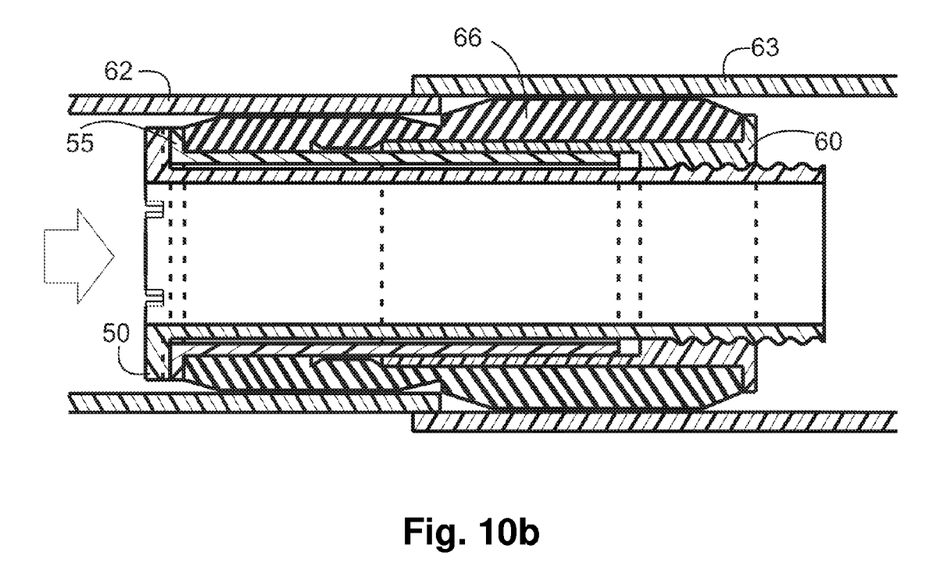

FIGS. 10a and 10b illustrate another embodiment of the same coupling device of the present invention. The present coupling comprises of a first tubular member 50 a second tubular member 60. The tubular members 50 and 60 have mating threads so that the first tubular member can telescopically move into the second tubular member. The first member 50 having a smaller diameter than the second member 60, and is partially inserted into the second member. Both members having a top end and bottom end. The first member also having male threads on its outer surface and closer to the bottom end. The second member 60 having a top end and a bottom end and having female thread close to its bottom end. The inner diameter of the threaded section of the second member being the same as the outer diameter of the threaded section of the first member. Therefore, the first and the second elements can be threaded on each other. The first member 50 has a grooved or castle shaped top/head 2 as was shown in FIG. 1 to easily and effortlessly receive a bar shaped tool for rotation.

The seal 65 is stretched over both tubular members, covering the outer surface of both members. The seal is attached from one end to the top end of the first tubular element and from the other end to the bottom end of the second tubular element. Therefore, as the first member is screwed into the second member, the seal is compressed and deformed outwardly, engaging with the pipes.

The device is used to couple a first pipe 62 to a second pipe 63, whereas the first pipe 62 has a smaller diameter than the second pipe 63. The smaller pipe 62 can be concentrically and axially slide into the larger pipe 63. This coupling device is correctly positioned within two concentric pipes 62 and 63. The first element is rotated to screw it into the second cylinder, thereby deforming the seal 65. The deformed seal 66, as illustrated in FIG. 10b, grips the pipes, sealing the coupling between the two pipes.

In the present embodiment, the first tubular element is rotated to screw into the second tubular element, which is generally stationary. In order to prevent the rotation of the seal as the first tubular element is rotated, a tubular sleeve 55 is concentrically located between the rotating cylinder 50 and a seal 65 to isolate the seal material from rotation. The device in the uncompressed form can be located inside the pipes. Since the head of the cylinder 50 is wide, it is easy to locate a tool into the castle head. Walls of the pipe 62 guide and contain the tool on the castle head.

Once the apparatus is correctly positioned between the pipes, it can be installed in one operation by simply locating a bar shaped tool into a grooved or castle shaped head, and tightening to desired torque. The described mechanism claims to reduce installation time by reducing the number of tightening operations to one, and allowing easy location of the tool. The apparatus also ensures that the compressive forces are uniformly distributed ensuring a uniform seal.

Although the disclosure describes and illustrates preferred embodiments of the invention, it is to be understood that the invention is not limited to these particular embodiments. Many variations and modifications will now occur to those skilled in the art. For a definition of the invention reference is made to the appended claims.

What is claimed is:

1. A drain pipe coupling comprising:
   a. a first tubular member having a first tube diameter and a first tube length, a first end and a second end, wherein said first end having a first collar, said first collar having a diameter larger than the first tube diameter forming a lip at said first end;
   b. said first tubular member further having male threads on its outer surface, said threads starting from said second end and extending over a portion of the outer surface of said first member;
   c. a second tubular member having a second tube diameter and a second tube length, an inlet end and an outlet end, wherein said outlet end having a second collar, said second collar having a diameter larger than the second tube diameter forming a lip at said outlet end;
   d. said second tubular member further having female threads on its inner surface, said threads starting from said outlet end and extending along a portion of the inner surface of said second member, wherein said female threads adapted to receive said male threads;
   e. an elastic tubular cover appropriately sized to extend over both said first and said second members when said first and second members are partially screwed into each other, and wherein said first and said second collars hold the elastic cover at both ends;
   f. said collar of the first tubular member having a mating head to receive a tightening tool for rotating the first tubular member; and
   g. a ring or a tubular sleeve concentrically placed on the first tubular member between said first collar and one end of the elastic member to reduce friction and prevent the elastic member from twisting or rotating when the tubular member is rotated,
   whereby said coupling is inserted in between a roof drain pipe and an extension pipe and the first member is screwed into the second member, whereby the rotation of the first member reduces the length of the coupling, compressing and deforming the elastic cover outwardly to sealably contact with the inner surfaces of the drain and extension pipes.

2. The drain pipe coupling of claim 1, further having a mating mechanism wherein said ring or tubular sleeve further having indentations or teeth and wherein said first collar further having at least one bump that can lock into said indentations or teeth of said ring,
   whereby this mating mechanism allows the coupling to be easily tightened while being installed, but locks the housing once fully tightened.

3. The drain pipe coupling of claim 1, wherein said mating head being a castle head.

* * * * *